(12) United States Patent
Jung et al.

(10) Patent No.: US 11,152,779 B2
(45) Date of Patent: Oct. 19, 2021

(54) ELECTRONIC DEVICE AND METHOD FOR PREVENTING CORROSION OF AUDIO JACK

(71) Applicant: SAMSUNG ELECTRONICS CO., LTD., Suwon-si (KR)

(72) Inventors: Daun Jung, Suwon-si (KR); Min Lee, Suwon-si (KR); Jinyoung Kim, Suwon-si (KR); Jongkwang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 16/427,652

(22) Filed: May 31, 2019

(65) Prior Publication Data

US 2019/0372334 A1    Dec. 5, 2019

(30) Foreign Application Priority Data

Jun. 1, 2018    (KR) .................. 10-2018-0063788

(51) Int. Cl.
*H02H 5/00*  (2006.01)
*H02H 1/00*  (2006.01)
*H04R 3/00*  (2006.01)

(52) U.S. Cl.
CPC ............ *H02H 5/00* (2013.01); *H02H 1/0007* (2013.01); *H04R 3/00* (2013.01); *H04R 2420/05* (2013.01)

(58) Field of Classification Search
CPC .......... H02H 5/00; H02H 1/0007; H04R 3/00; H04R 2420/05
See application file for complete search history.

(56) References Cited

U.S. PATENT DOCUMENTS

2013/0142350 A1    6/2013    Larsen et al.
2013/0293240 A1   11/2013    Seo et al.
2014/0038460 A1    2/2014    Lee et al.
(Continued)

FOREIGN PATENT DOCUMENTS

EP          2 961 197       12/2015

OTHER PUBLICATIONS

International Search Report dated Sep. 10, 2019 in counterpart International Patent Application No. PCT/KR2019/006618.
(Continued)

*Primary Examiner* — Jue Zhang
(74) *Attorney, Agent, or Firm* — Nixon & Vanderhye P.C.

(57) ABSTRACT

The disclosure provides a technique to prevent and/or reduce a terminal of an audio jack from being corroded due to residual moisture introduced into the audio jack. According to various embodiments of the disclosure, an electronic device may include an audio jack including a plurality of terminals including a first detection terminal and a second detection terminal; at least one processor functionally connected to the audio jack; and a memory. The memory may store instructions that, when executed by the at least one processor, control the electronic device to: detect an occurrence of an insertion interrupt of an object in the audio jack through the first detection terminal, determine whether the object is a jack plug based on an impedance value measured through the second detection terminal, and stop applying a voltage to the first detection terminal when the object is determined not to be the jack plug.

18 Claims, 10 Drawing Sheets

(56) References Cited

U.S. PATENT DOCUMENTS

| | | |
|---|---|---|
| 2014/0055167 A1 | 2/2014 | Oh et al. |
| 2015/0326970 A1 | 11/2015 | Miske et al. |
| 2015/0346127 A1* | 12/2015 | Kalinichev ............ H02H 5/083 |
| | | 361/86 |
| 2015/0377810 A1 | 12/2015 | Roh et al. |
| 2016/0157033 A1 | 6/2016 | Won et al. |
| 2017/0272877 A1 | 9/2017 | Roh et al. |
| 2019/0128949 A1* | 5/2019 | Bowlerwell ........... G01R 31/68 |

OTHER PUBLICATIONS

Extended Search Report dated Oct. 21, 2019 in counterpart European Patent Application No. 19177707.7.

* cited by examiner

ELECTRONIC DEVICE AND METHOD FOR PREVENTING CORROSION OF AUDIO JACK

CROSS-REFERENCE TO RELATED APPLICATION

This application is based on and claims priority under 35 U.S.C. 119 to Korean Patent Application No. 10-2018-0063788, filed on Jun. 1, 2018, in the Korean Intellectual Property Office, the disclosure of which is incorporated by reference herein in its entirety.

BACKGROUND

Field

The disclosure relates to an electronic device and method for preventing/reducing corrosion of an audio jack.

Description of Related Art

An electronic device such as a mobile electronic device (e.g., a smart phone) may include one or more electronic components, such as a speaker, an audio jack, and a connection port, associated with an opening hole that opens to the outside of the housing of the electronic device. Sometimes the electronic device may be used in a rain or moisture environment, so that moisture (or water) may be introduced into the electronic device through the opening hole.

When moisture is introduced into the opening hole for the audio jack, the electronic device may incorrectly recognize a jack plug as being inserted and thereby incorrectly perform an operation of switching a current audio mode to an earphone mode. In order to prevent and/or reduce this malfunction, the electronic device may distinguish the inflow of moisture from the insertion of the jack plug and exclude the former case from the earphone mode.

However, because the electronic device applies a voltage to at least one of terminals included in the audio jack to recognize an object insertion, such a terminal of the audio jack may be corroded due to residual moisture inside the audio jack.

SUMMARY

The disclosure provides a technique to prevent and/or reduce a terminal of an audio jack from being corroded due to residual moisture introduced into the audio jack.

According to various example embodiments of the disclosure, an electronic device may include an audio jack including a plurality of terminals including a first detection terminal and a second detection terminal; at least one processor functionally connected to the audio jack; and a memory. The memory may store instructions that when executed by the at least one processor control the electronic device to: detect an occurrence of an insertion interrupt of an object in the audio jack through the first detection terminal, determine whether the object is a jack plug based on an impedance value measured through the second detection terminal, and stop applying a voltage to the first detection terminal based on the object being determined to not be the jack plug.

According to various example embodiments of the disclosure, a method for preventing and/or reducing audio jack corrosion in an electronic device may include detecting an occurrence of an insertion interrupt of an object through a first detection terminal among a plurality of terminals included in an audio jack; measuring an impedance value through a second detection terminal among the plurality of terminals in response to the insertion interrupt; determining whether the object is a jack plug, based on the measured impedance value; and stopping applying a voltage to the first detection terminal based on the object being determined to not be the jack plug.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
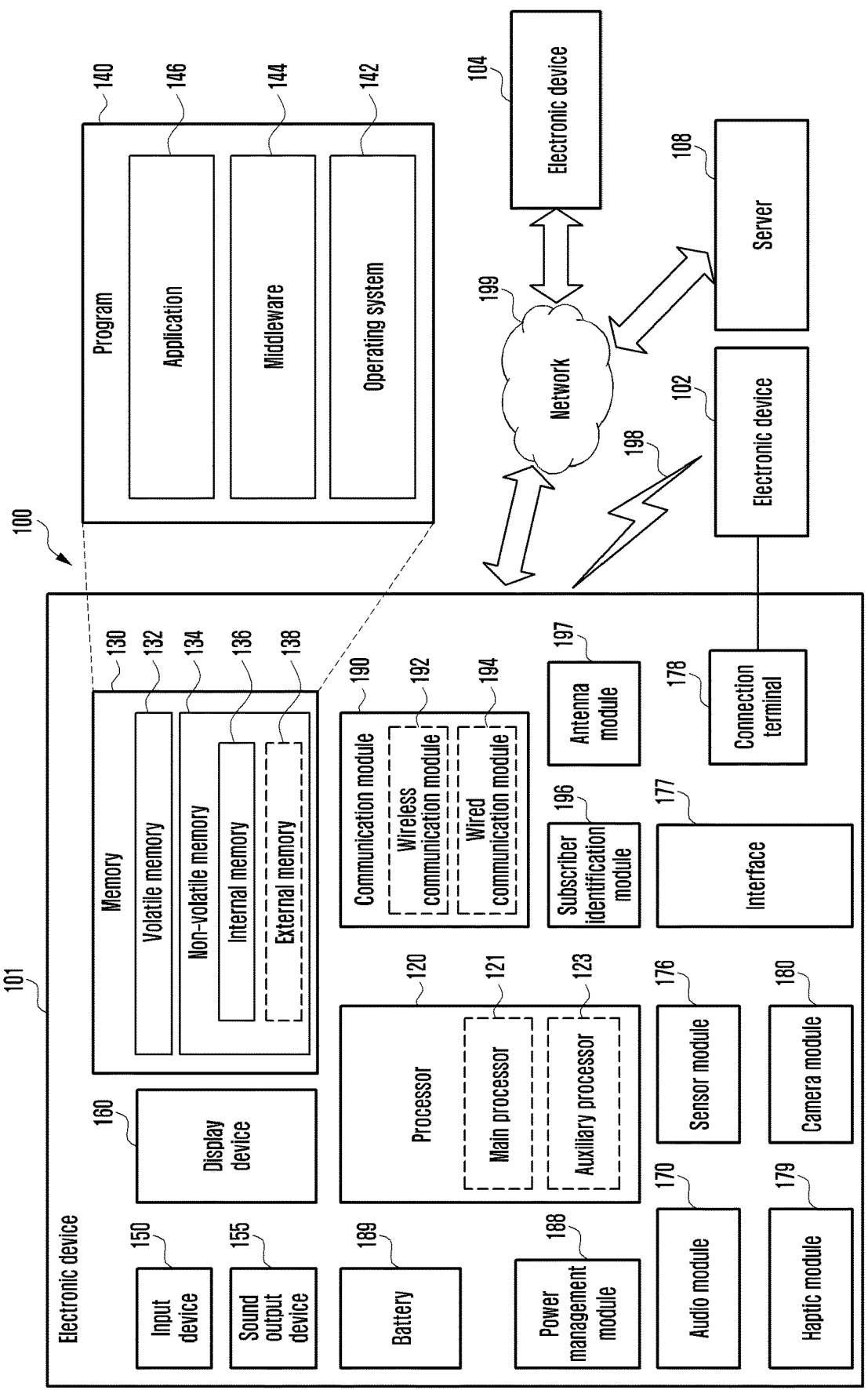
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 2:
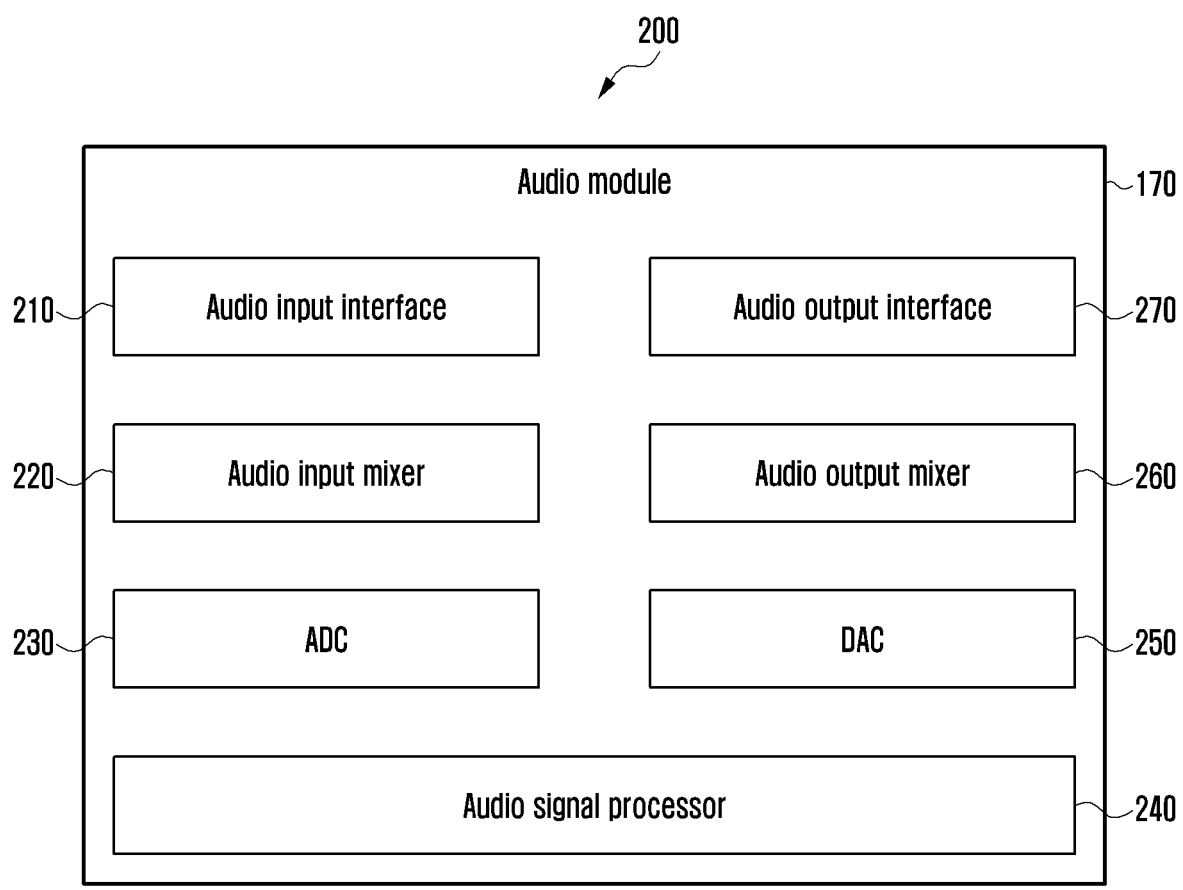
FIG. 2 is a block diagram illustrating an example audio module according to various embodiments.

FIG. 2 is a block diagram 200 illustrating an example audio module 170 according to various embodiments. Referring to FIG. 2, the audio module 170 may include, for example, an audio input interface (e.g., including audio input circuitry) 210, an audio input mixer (e.g., including audio mixer circuitry) 220, an analog-to-digital converter (ADC) (e.g., including ADC circuitry) 230, an audio signal processor (e.g., including signal processing circuitry) 240, a digital-to-analog converter (DAC) (e.g., including DAC circuitry) 250, an audio output mixer (e.g., including audio mixer circuitry) 260, and/or an audio output interface (e.g., including audio output circuitry) 270.

The audio input interface 210 may include various audio input circuitry and receive an audio signal corresponding to a sound obtained from the outside of the electronic device 101 via, for example, a microphone (e.g., a dynamic microphone, a condenser microphone, a piezo microphone, etc.) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may include various audio mixing circuitry and synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may include various ADC circuitry and convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may include various signal processing circuitry and perform various processing on a digital audio signal received via the ADC 230 or a digital audio signal received from another component of the electronic device 101. For example, according to an embodiment, the audio signal processor 240 may, for example, and without limitation, perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, extracting a specified signal for one or more digital audio signals, or the like. According to an embodiment, one or more functions of the audio signal processor 240 may be implemented in the form of an equalizer.

The DAC 250 may include various DAC circuitry and convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal, but the disclosure is not limited thereto.

The audio output mixer 260 may include various mixing circuitry and synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may include various audio output interface circuitry and output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

Figure 3:
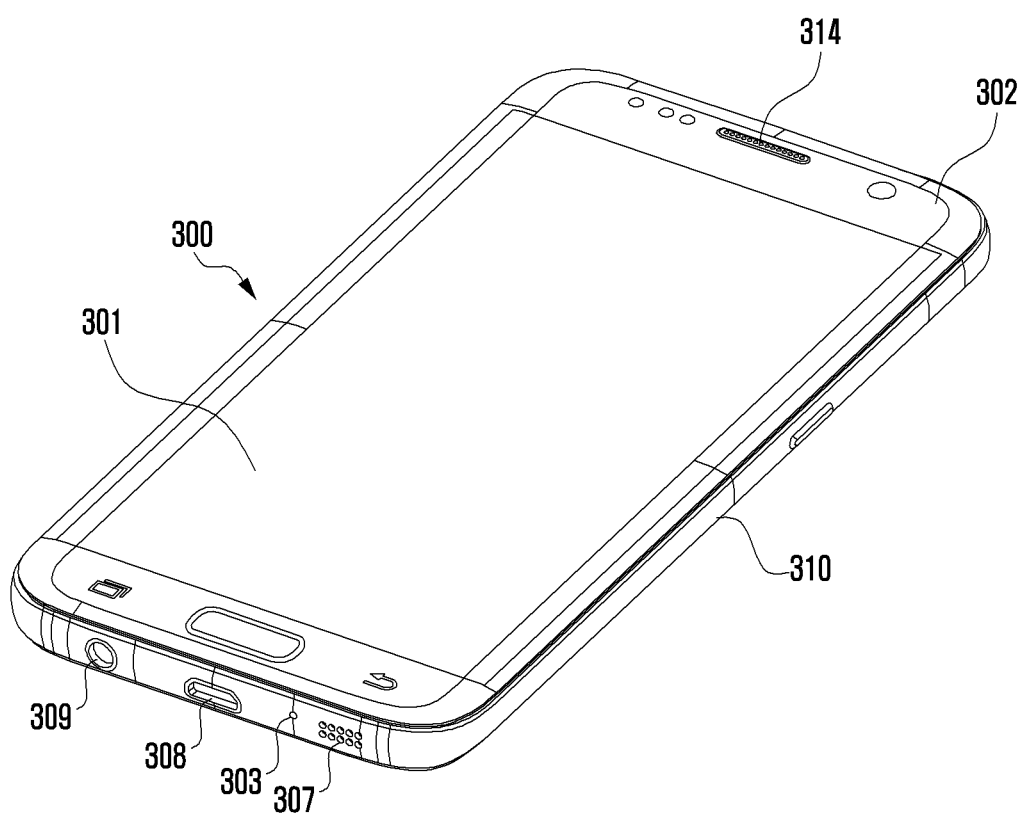
FIG. 3 is a perspective view illustrating a front surface of an example mobile electronic device according to an embodiment.

FIG. 3 is a perspective view illustrating a front surface of an example mobile electronic device according to an embodiment.

Referring to FIG. 3, an electronic device 300 (e.g., the electronic device 101 in FIG. 1) according to an embodiment may include a housing 310 including a first surface (or front surface), a second surface (or rear surface), a lateral surface surrounding a space between the first and second surfaces. In another embodiment (not shown), the housing may indicate a structure forming a part of the first, second and lateral surfaces.

According to an embodiment, the electronic device 300 may include a display 301 (e.g., the display 160 in FIG. 1), audio modules 303, 307 and 314 (e.g., the audio module 170 in FIG. 1), and connector holes 308 and 309. Although not shown, the electronic device 300 may further include, at least in part, elements or components shown in FIGS. 1 and 2.

The display 301 may be exposed through a substantial portion of a front plate 302. The display 301 may be combined with or disposed adjacent to a touch sensing circuit, a pressure sensor capable of measuring the intensity (pressure) of a touch, and/or a digitizer for detecting a stylus pen in a magnetic field.

The audio modules 303, 307 and 314 may include, for example, a microphone hole 303 and speaker holes 307 and 314. A microphone for acquiring an external sound may be disposed near the microphone hole 303, and in some embodiments, a plurality of microphones may be disposed to detect the direction of sound. The speaker holes 307 and 314 may include, for example, an external speaker hole 307 and a call receiver hole 314. In some embodiments, the speaker holes 307 and 314 and the microphone hole 303 may be implemented as a single hole, or a certain speaker (e.g., a piezo speaker) may be implemented without such speaker holes 307 and 314.

The connector holes 308 and 309 may include, for example, a first connector hole 308 capable of accommodating a connector (e.g., a USB cable) for transmitting and receiving power and/or data to and from an external electronic device, and a second connector hole 309 capable of accommodating a connector (e.g., a jack plug) for transmitting and receiving an audio signal to and from an external electronic device.

The electronic device 300 according to various embodiments may include an audio jack (or an ear jack) having a structure exposed to the second connector hole 309 into which a jack plug can be inserted. The audio jack may include, for example, at least one of a left (L) audio terminal, a right (R) audio terminal, a microphone (M) terminal, and a ground (G) terminal. In the second connector hole 309, not only can the jack plug be inserted, but also foreign matter such as, for example, and without limitation, dust, moisture, or the like may be introduced. Even in the latter case, based on a change of impedance values of audio jack terminals, the electronic device 300 may incorrectly recognize the jack plug as being inserted.

According to various embodiments, the audio jack may be implemented with a structure capable of controlling to stop/resume (or off/on) applying a voltage to an L-detection terminal for measuring the impedance value of the L-terminal, based on the type of an inserted object. Hereinafter, an example configuration of the audio jack and the configuration of the jack plug will be described in greater detail.

Figure 4:
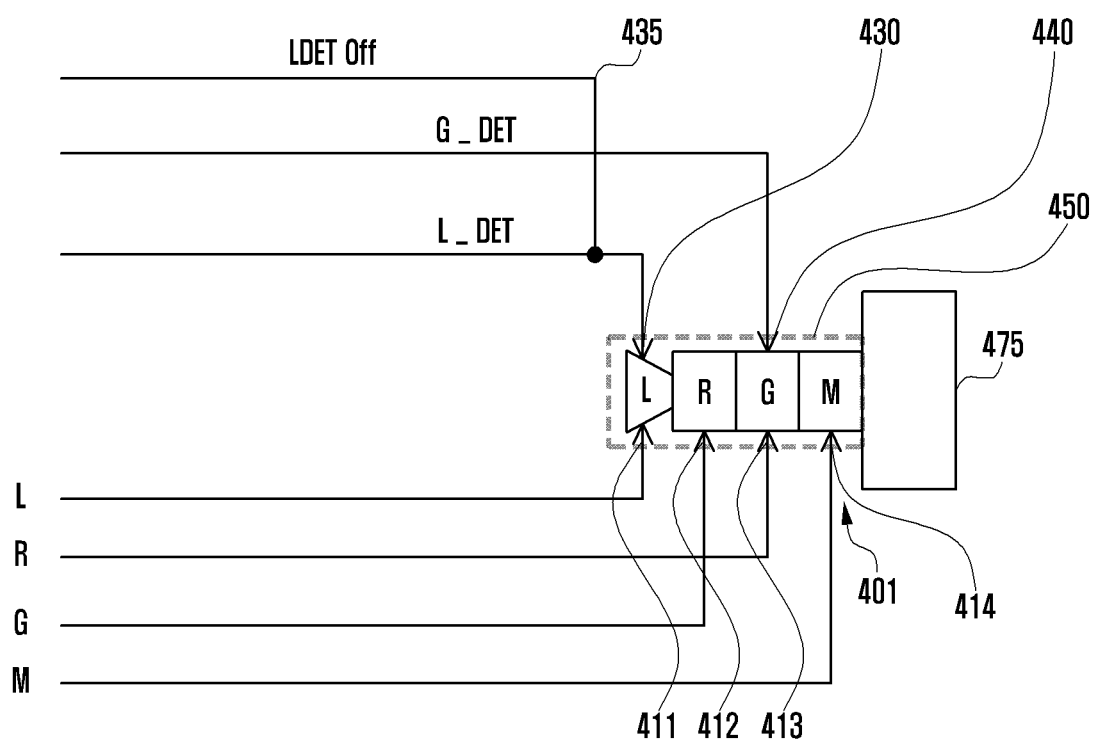
FIG. 4 is a schematic diagram illustrating an example audio jack of an example electronic device according to an embodiment.

FIG. 4 is a schematic diagram illustrating an example audio jack 401 of an electronic device according to an embodiment.

Referring to FIG. 4, the audio jack 401 provided in the electronic device (e.g., the electronic device 101 in FIG. 1, the electronic device 300 in FIG. 3) according to an embodiment may include, for example, a left (L) audio terminal 411, a right (R) audio terminal 412, a ground (G) terminal 413, and a microphone (M) terminal 414, an L-detection terminal 430, and a G-detection terminal 440. In one example, the audio jack 401 may be exposed to the second connector hole (e.g., 309 in FIG. 3) and may be implemented as a structure allowing a jack plug 475 to be inserted through the second connector hole 309. A dotted line in FIG. 4 indicates an insertion passage 450 into which the jack plug 475 can be inserted. At least some of the audio jack 401 terminals can be exposed on the wall of the insertion passage 450. The jack plug 475 may be electrically connected to the electronic device. The jack plug 475 may have, for example, a structure including an L contact, an R contact, a G contact, and an M contact that can be in contact with corresponding terminals of the audio jack 401. This structure is, however, an example only, and any other type of jack plug may be available.

According to various embodiments, the L-detection terminal 430 of the audio jack 401 may be connected to a control line 435 for controlling a voltage applied to the L-detection terminal 430. For example, the control line 435 may cut off the power supply to a detection circuit (e.g., included in a jack recognition circuit) connected to the L-detection terminal 430, or turn on/off a control switch to or not to apply a voltage to the L-detection terminal 430.

According to an embodiment, based on the L-impedance value of the L-detection terminal 430 disposed at the position of the L terminal 411, the electronic device may determine whether an object is inserted into the audio jack 401. For example, the electronic device may detect the occurrence of an L-terminal interrupt, based on the L-impedance value of the L-detection terminal 430.

According to an embodiment, in response to the occurrence of the L-terminal interrupt, the electronic device may measure the G-impedance value through the G-detection terminal 440 and determine the type of an object inserted in the audio jack 401 based on the G-impedance value. If the determined type indicates an abnormal insertion type such as, for example, moisture, the electronic device may exceptionally process output mode switching of the audio jack 401. For example, even though a change in L-impedance value indicates the occurrence of an L-terminal interrupt due to a moisture inflow, the electronic device may not switch the output mode of the audio jack 401 when the G-impedance value indicates the moisture inflow.

According to an embodiment, the electronic device may repeatedly determine whether moisture remains, by determining an object type based on the G-impedance value measured through the G-detection terminal 440 at a predetermined time interval. In this case, the electronic device may not switch the output mode of the audio jack 401 due to the moisture inflow. However, because applying a voltage to the L-detection terminal 430 is maintained for measuring the L-impedance value, the L-detection terminal 430 may corrode due to remaining moisture. When the L-detection terminal 430 is corroded, another problem that a normal jack plug insertion is unrecognizable may be caused.

According to an embodiment, when determining that moisture has been introduced based on the G-impedance value, the electronic device may control the control line 435 to stop applying a voltage to the L-detection terminal 430. As a result, a voltage detection path is cut off and thereby the L-terminal interrupt based on the L-impedance value is not recognized. Therefore, when it is determined that moisture has been introduced based on the G-impedance value, the electronic device can prevent and/or reduce the corrosion of the L-detection terminal 430 due to the residual moisture and further prevent and/or reduce a failure to recognize a jack plug insertion due to the corrosion of the audio jack 401. Thereafter, until it is determined that moisture has not flowed into the audio jack based on the G-impedance value, the electronic device can perform control to stop applying a voltage to the L-detection terminal 430.

Figure 5:
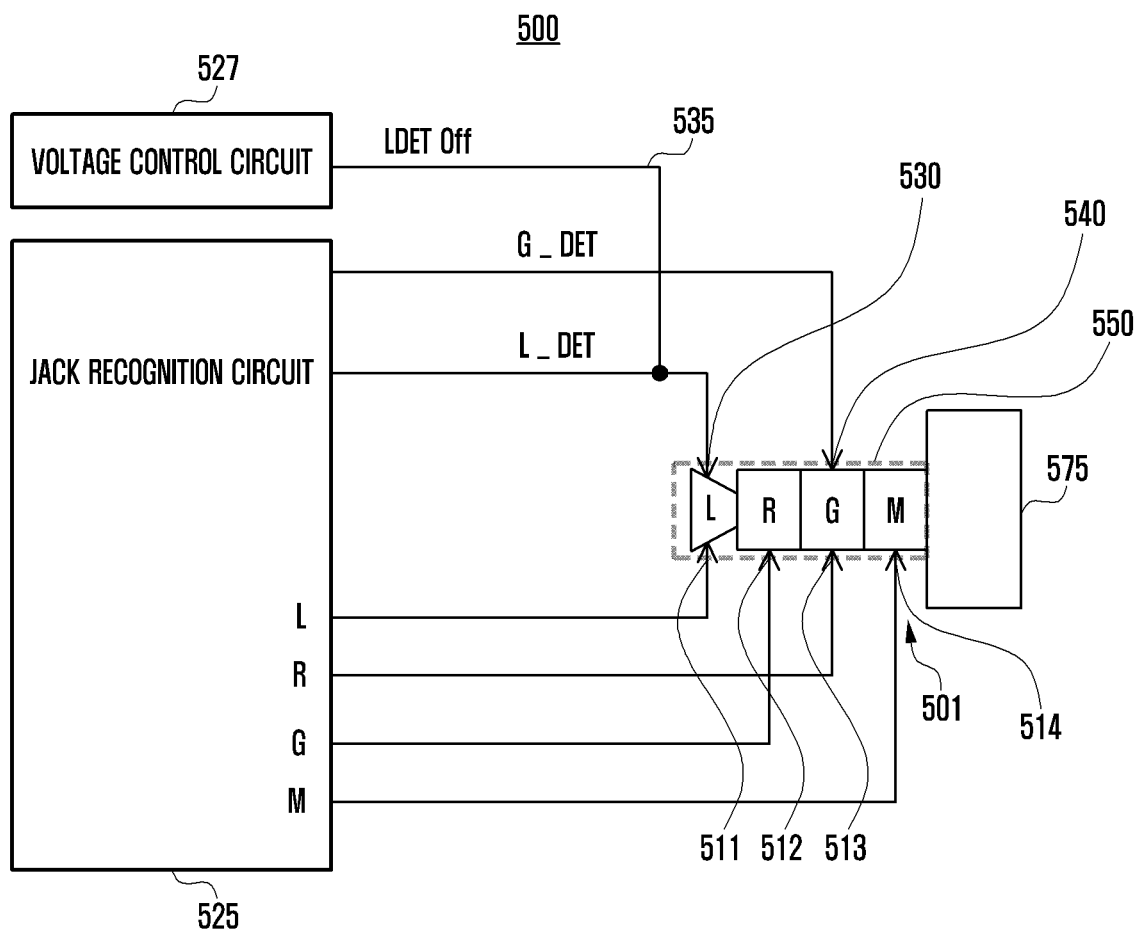
FIG. 5 is a schematic diagram illustrating an example electronic device including an audio jack according to an embodiment.

FIG. 5 is a schematic diagram illustrating an example electronic device 500 including an example audio jack 501 according to an embodiment.

Referring to FIG. 5, in an embodiment, the audio jack 501 (e.g., the audio jack 401 in FIG. 4) of the electronic device 500 (e.g., the electronic device 101 in FIG. 1 or the electronic device 300 in FIG. 3) may be electrically connected to a jack recognition circuit 525 and a voltage control circuit 527. According to an embodiment, the jack recognition circuit 525 and the voltage control circuit 527 may be coupled to a processor (not shown) (e.g., an application processor), which controls the operations of the jack recognition circuit 525 and the voltage control circuit 527.

According to an embodiment, the jack recognition circuit 525 may be connected to a memory (not shown). The jack recognition circuit 525 may drive an audio jack driver of the kernel based on instructions stored in the memory, thereby recognizing an L-terminal interrupt via an L-detection terminal 530 and then calculating a G-impedance value measured via a G-detection terminal 540 to stop or resume applying a voltage to the L-detection terminal 530. The voltage control circuit 527 may be, but not limited to, a general purpose input output (GPIO) control circuit.

According to an embodiment, the audio jack 501 may include an insertion passage 550 into or from which a jack plug 575 is inserted or removed through a connector hole (e.g., the second connector hole 309 in FIG. 3). The audio jack 501 may include an L terminal 511, an R terminal 512, a G terminal 513, an M terminal 514, the L-detection terminal 530, and the G-detection terminal 540, which are exposed on a wall of the insertion passage 550. Inside the electronic device 500, the L terminal 511 may be located farther away from the connector hole, and the M terminal 514 may be closest to the connector hole.

The jack plug 575 of an audio device may be inserted into the insertion passage 550 through the connector hole. In an embodiment, the jack plug 575 may include, for example, an L contact, an R contact, a G contact, and an M contact. In another embodiment, the jack plug 575 may include the L contact, the R contact, and the G contact. The number and configuration of such contacts of the jack plug 575 are determined depending on an audio device type or a manufacturer. In an embodiment, when the jack plug 575 is being inserted into the audio jack 501, the L contact of the jack plug 575 passes through the terminals of the audio jack 501 sequentially in the order of the M terminal 514, the G terminal 513, the R terminal 512, and the L terminal 511.

According to an embodiment, the jack recognition circuit 525 may be electrically connected to the L terminal 511, the R terminal 512, the G terminal 513, the M terminal 514, the L-detection terminal 530, and the G-detection terminal 540 of the audio jack 501.

Although not shown, the jack recognition circuit 525 may include circuitry for controlling transmission and reception of audio signals, a codec, and a detection circuit. According to another embodiment, the L terminal 511, the R terminal 512, the G terminal 513, the M terminal 514, and the L-detection terminal 530 may be connected to the codec (not shown), and the L-detection terminal 530 and the G-detection terminal 540 may be connected to the detection circuit (not shown).

The M terminal 514 may be connected to a microphone line of the jack recognition circuit 525 (or codec). The M terminal 514 may receive a sound input through the M contact of the jack plug 575 and provide the received input to the jack recognition circuit 525 (or codec).

The R terminal 512 may be connected to an R line of the jack recognition circuit 525 (or codec) so as to output a right-side sound. When the jack plug 575 is inserted into the audio jack 501, the R terminal 512 may output a sound received from the R line toward the jack plug 575.

The L terminal 511 may be connected to an L line of the jack recognition circuit 525 (or codec) so as to output a left-side sound. The L-detection terminal 530 disposed at the position of the L terminal 511 may be connected to an L-detection line of the jack recognition circuit 525 (or detection circuit). When the jack plug 575 is inserted into the audio jack 501, the L terminal 511 may output a sound received from the L line toward the jack plug 575. The L-detection terminal 530 may be connected to a control line 535 capable of control the L-detection line to stop or release (or off or on) a voltage (or current) applied to the L-detection line.

The G terminal 513 may be connected to a ground line of the jack recognition circuit 525 (or codec). The G-detection terminal 540 disposed at the position of the G terminal 513 may be connected to a G-detection line of the jack recognition circuit 525 (or detection circuit).

According to an embodiment, the jack recognition circuit 525 may determine whether an object has been inserted into the audio jack 501, based on an L-impedance value measured from the L-detection terminal 530. For example, the jack recognition circuit 525 may apply a voltage to the L-detection terminal 530 and detect a change in the L-impedance value from the L-detection terminal 530. The L-impedance value may be changed when an object inserted or introduced into the audio jack 501 is in contact with the L-detection terminal 530. When the L-impedance value is changed, the jack recognition circuit 525 may generate an L-terminal interrupt that indicates an insertion of an object within the audio jack 501.

According to an embodiment, upon the generation of the L-terminal interrupt, the jack recognition circuit 525 may apply a voltage to the G-detection terminal 540 and calculate (e.g., determine) a G-impedance value of the G terminal 513 measured from the G-detection terminal 540.

According to an embodiment, based on the calculated (e.g., determined) G-impedance value, the jack recognition circuitry 525 may determine the type of an object inserted into the audio jack 501. For example, when the G-impedance value is equal to or greater than a set threshold value (e.g., 1500 or more), the jack recognition circuit 525 may determine that the type of an inserted object is a normal type such as a jack plug. On the other hand, when the G-impedance value is smaller than the set threshold value (e.g., less than 10), the jack recognition circuit 525 may determine that the type of an inserted object is an abnormal type such as moisture.

According to an embodiment, when it is determined that the object is of an abnormal type such as moisture, the jack recognition circuit 525 may deliver an OFF signal indicating the existence of moisture in the audio jack 501 to the voltage control circuit 527. In response to the OFF signal received from the jack recognition circuit 525, the voltage control circuit 527 may perform control to stop applying a voltage to the L-detection terminal 530.

According to an embodiment, the jack recognition circuit 525 may repeatedly determine whether the moisture remains, based on the G-impedance value at a predetermined time interval while applying a voltage to the L-detection terminal 530 is stopped. When the G-impedance value measured from the G-detection terminal 540 is changed to a value indicating no existence of moisture (e.g., a moisture level below a threshold value) in the audio jack 501, the jack recognition circuit 525 may deliver an ON signal indicating no/low existence of moisture in the audio jack 501 to the voltage control circuit 527. In response to the ON signal received from the jack recognition circuit 525, the voltage control circuit 527 may perform control to resume applying a voltage to the L-detection terminal 530.

Figure 6:
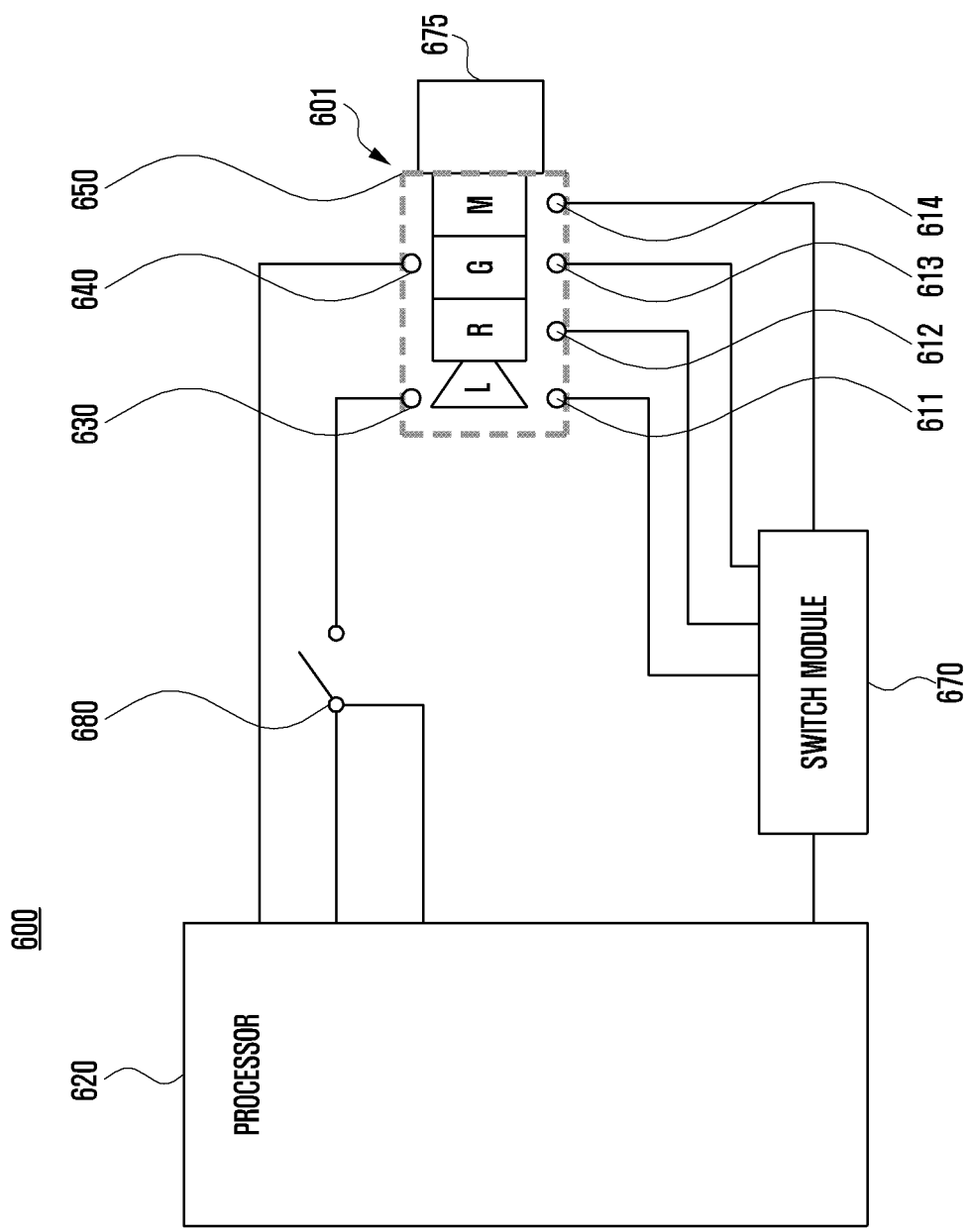
FIG. 6 is a schematic diagram illustrating an example electronic device including an audio jack according to an embodiment.

FIG. 6 is a schematic diagram illustrating an example electronic device 600 including an example audio jack 601 according to an embodiment.

Referring to FIG. 6, the audio jack 601 (e.g., the audio jack 401 in FIG. 4) of the electronic device 600 (e.g., the electronic device 101 in FIG. 1 or the electronic device 300 in FIG. 3) may be electrically coupled to a processor 620 (e.g., the processor 120 in FIG. 1) and a switch module (e.g., including a switch) 670. According to an embodiment, the processor 620 may include or be electrically connected to the jack recognition circuit 525 and the voltage control circuit 527 which are shown in FIG. 5. The same description as that made above in FIG. 4 will not be repeated here. In the following description, it is assumed that signals of the audio jack 601 are controlled under the control of the processor 620.

According to an embodiment, the processor 620 may be coupled to a memory (not shown). Based on instructions stored in the memory, the processor 620 may control an audio jack driver of the kernel and a general purpose input output (GPIO) control circuit, recognize an L-terminal interrupt through an L-detection terminal 630, calculate and compare a G-impedance value measured via a G-detection terminal 640, and thereby stop or resume applying a voltage to the L-detection terminal 630.

According to an embodiment, the audio jack 601 may include an insertion passage 650 into or from which a jack plug 675 is inserted or removed through a connector hole (e.g., the second connector hole 309 in FIG. 3). When the jack plug 675 is inserted into the insertion passage 650, both an L terminal 611 and the L-detection terminal 630 which are disposed on a wall of insertion passage 650 may be in contact with an L contact of the jack plug 675. Similarly, an R terminal 612 may be in contact with an R contact, both a G terminal 613 and the G-detection terminal 640 may be in contact with a G contact, and an M terminal 614 may be in contact with an M contact.

According to an embodiment, the switch module 670 may be electrically coupled to the R terminal 611, the L terminal 612, the G terminal 613, and the M terminal 614 of the audio jack 601 as well as to the processor 620. Although not shown, the switch module 670 may be electrically connected to an audio module (e.g., the audio module 170 in FIGS. 1 and 2). Depending on whether the jack plug is inserted, the processor 620 may control the switch module 670 to switch an output path of audio signals to a speaker mode or an audio jack output mode.

According to another embodiment, the switch module 670 may be omitted. In this case, the R terminal 611, the L terminal 612, the G terminal 613, and the M terminal 614 may be directly connected to the processor 620.

According to an embodiment, the G-detection terminal 640 of the audio jack 601 may be connected to the processor 620. In addition, the L-detection terminal 630 of the audio jack 601 may be is connected to the processor 620 through the control switch 680, which is capable of allowing or stopping the supply of a voltage to the L-detection terminal 630.

According to an embodiment, the processor 620 may apply a voltage to the L-detection terminal 630 and then, when an L-impedance value of the L-detection terminal 630 is changed, generate an L-terminal interrupt that indicates an insertion of an object within the audio jack 601.

According to an embodiment, the processor 620 may apply a voltage to the G-detection terminal 640 in response to the L-terminal interrupt and then calculate (e.g., determine) a G-impedance value measured from the G-detection terminal 640. Based on the G-impedance value, the processor 620 may determine whether the jack plug 675 is inserted into the audio jack 601 or an abnormal substance such as moisture is inserted.

According to an embodiment, when determining, based on the G-impedance value, that an object inserted into the audio jack 601 is of a normal type such as the jack plug, the processor 620 may control the switch module 670 to switch the audio signal path to the audio jack output mode. For example, the processor 620 may switch the speaker mode and the audio jack output mode through the switch module 670 and thereby control input and output of audio signals. For example, in the speaker mode, the processor 620 may control L, G, and M signal paths to be connected to a speaker or microphone device equipped in the electronic device 600. On the other hand, in the audio jack output mode, the processor 620 may control the L, G, and M signal paths to be connected to the L, G, and M terminals of the audio jack 601.

According to an embodiment, when determining, based on the G-impedance value, that an object inserted into the audio jack 601 is of an abnormal type such as moisture, the processor 620 may control the control switch 680 to be turned off. Therefore, a current or voltage is not applied to the L-detection terminal 630. Further, the processor 620 may control the switch module 670 to maintain the speaker mode without switching the audio signal path to the audio jack output mode.

According to an embodiment, while no voltage is applied to the L-detection terminal 630, the processor 620 may repeatedly determine, based on the G-impedance value, whether the moisture remains within the audio jack 601. This determination may be performed at a predetermined time interval. If the G-impedance value measured from the G-detection terminal 640 indicates no/low existence of moisture in the audio jack 601, the processor 620 may control the control switch 680 to be turned on. Therefore, a current or voltage is applied again to the L-detection terminal 630.

According to another embodiment, the processor 620 may distinguish some measurement ranges based on the G-impedance value measured from the G-detection terminal 640 and determine the insertion type based on the measurement range. For example, the measurement ranges may include a first G-impedance value range in a condition where no moisture exists in the audio jack 601, a second G-impedance value range in a condition where moisture exists in the audio jack 601, a third G-impedance value range in a condition where no moisture exists in the audio jack 601 and the jack plug 675 is inserted into the audio jack 601, and a fourth G-impedance value range in a condition where moisture exists in the audio jack 601 and the jack plug 675 is inserted into the audio jack 601.

According to another embodiment, the processor 620 may distinguish some measurement ranges based on the G-impedance value and control the operation of the audio jack 601 according to the insertion type corresponding to the measurement range. For example, in case of a condition where moisture exists in the audio jack 601, the processor 620 may stop applying a voltage to the L-detection terminal 630. If it is changed to a condition where moisture does not exist in the audio jack 601 or a condition where the jack plug 675 is inserted, the processor 620 may resume applying the voltage to the L-detection terminal 630. In addition, when moisture exists in the audio jack 601 and also the jack plug 675 is inserted, the processor 620 may switch an audio signal path to an audio jack output mode because of having to transmit and receive audio signals through the jack plug 675.

According to various embodiments, an electronic device (e.g., the electronic device 101 in FIG. 1, the electronic device 300 in FIG. 3, the electronic device 500 in FIG. 5, or the electronic device 600 in FIG. 6) may include an audio jack (e.g., the audio jack 401 in FIG. 4, the audio jack 501 in FIG. 5, or the audio jack 601 in FIG. 6) including a plurality of terminals including a first detection terminal and a second detection terminal. The electronic device may further include at least one processor (e.g., the processor 120 in FIG. 1 or the processor 620 in FIG. 6) functionally connected to the audio jack, and a memory (e.g., the memory 130 in FIG. 1). The memory may store instructions that cause, when executed, the at least one processor to: detect an occurrence of an insertion interrupt of an object in the audio jack through the first detection terminal, determine whether the object is a jack plug, based on an impedance value measured through the second detection terminal, and stop applying a voltage to the first detection terminal when the object is determined to be an abnormal substance other than the jack plug.

In an example embodiment, the plurality of terminals may include a left (L) terminal (e.g., the L terminal 411 in FIG. 4, the L terminal 511 in FIG. 5, or the L terminal 611 in FIG. 6), a right (R) terminal (e.g., the R terminal 412 in FIG. 4, the R terminal 512 in FIG. 5, or the R terminal 612 in FIG. 6), a ground (G) terminal (e.g., the G terminal 413 in FIG. 4, the G terminal 513 in FIG. 5, or the G terminal 613 in FIG. 6), a microphone (M) terminal (e.g., the M terminal 414 in FIG. 4, the M terminal 514 in FIG. 5, or the M terminal 614 in FIG. 6), an L-detection terminal (e.g., the L-detection terminal 430 in FIG. 4, the L-detection terminal 530 in FIG. 5, or the L-detection terminal 630 in FIG. 6), and a G-detection terminal (e.g., the G-detection terminal 440 in FIG. 4, the G-detection terminal 540 in FIG. 5, or the G-detection terminal 640 in FIG. 6).

In an example embodiment, the first detection terminal may be the L-detection terminal, and the second detection terminal may be the G-detection terminal.

In an example embodiment, the processor may determine the object to be the jack plug for transmitting and receiving an audio signal when the impedance value measured through the second detection terminal is smaller than a first threshold value, and determine the object to be an abnormal substance other than the jack plug when the impedance value measured through the second detection terminal is equal to or greater than the first threshold value.

In an example embodiment, the processor may periodically check a change in the impedance value measured through the second detection terminal at a predetermined time interval after applying the voltage to the first detection terminal is stopped.

In an example embodiment, the processor may resume applying the voltage to the first detection terminal based on the impedance value measured through the second detection terminal being changed to be smaller than the first threshold value after applying the voltage to the first detection terminal is stopped.

In an example embodiment, the processor may periodically check a change in the impedance value measured through the second detection terminal at a predetermined time interval when the impedance value measured through the second detection terminal is changed to be equal to or greater than the first threshold value and be smaller than a second threshold value after applying the voltage to the first detection terminal is stopped, and resume applying the voltage to the first detection terminal based on the impedance value measured through the second detection terminal being changed to be equal to or greater than the second threshold value after applying the voltage to the first detection terminal is stopped.

In an example embodiment, the processor may switch an audio mode of the electronic device to an audio jack output mode based on the object being determined to be the jack plug, and switch the audio mode of the electronic device to a speaker mode based on the object being determined to be the abnormal substance.

In an example embodiment, the audio jack output mode may be a mode in which an audio signal path is directed toward the plurality of terminals of the audio jack.

In an example embodiment, the processor may identify a range of the impedance value measured through the second detection terminal, based on the identified range being a first measurement range, direct an audio signal path toward the plurality of terminals of the audio jack, upon recognition that the jack plug exists in the audio jack, based on the identified range being a second measurement range, stop applying a voltage to the first detection terminal, upon recognition that the abnormal substance exists in the audio jack, and periodically check the range of the impedance value measured through the second detection terminal, and based on the identified range being a third measurement range, direct the audio signal path toward the plurality of terminals of the audio jack, upon recognition that both the jack plug and the abnormal substance exist together in the audio jack.

In an example embodiment, the electronic device may further include a voltage control circuit electrically connected to the first detection terminal; and a jack recognition circuit electrically connected to the first and second detection terminals. The instructions may when executed by the at least one processor, control the electronic device to: detect an occurrence of an insertion interrupt in the jack recognition circuit, based on the object being determined to be the abnormal substance, provide the voltage control circuit with information indicating that the object is the abnormal substance other than the jack plug, and control the voltage control circuit to stop applying the voltage to the first detection terminal.

In an example embodiment, the electronic device may further include a control switch electrically connected to the processor and the first detection terminal. The instructions may, when executed by the at least one processor, control the electronic device to turn on or off the control switch to apply or stop applying the voltage to the first detection terminal.

Figure 7:
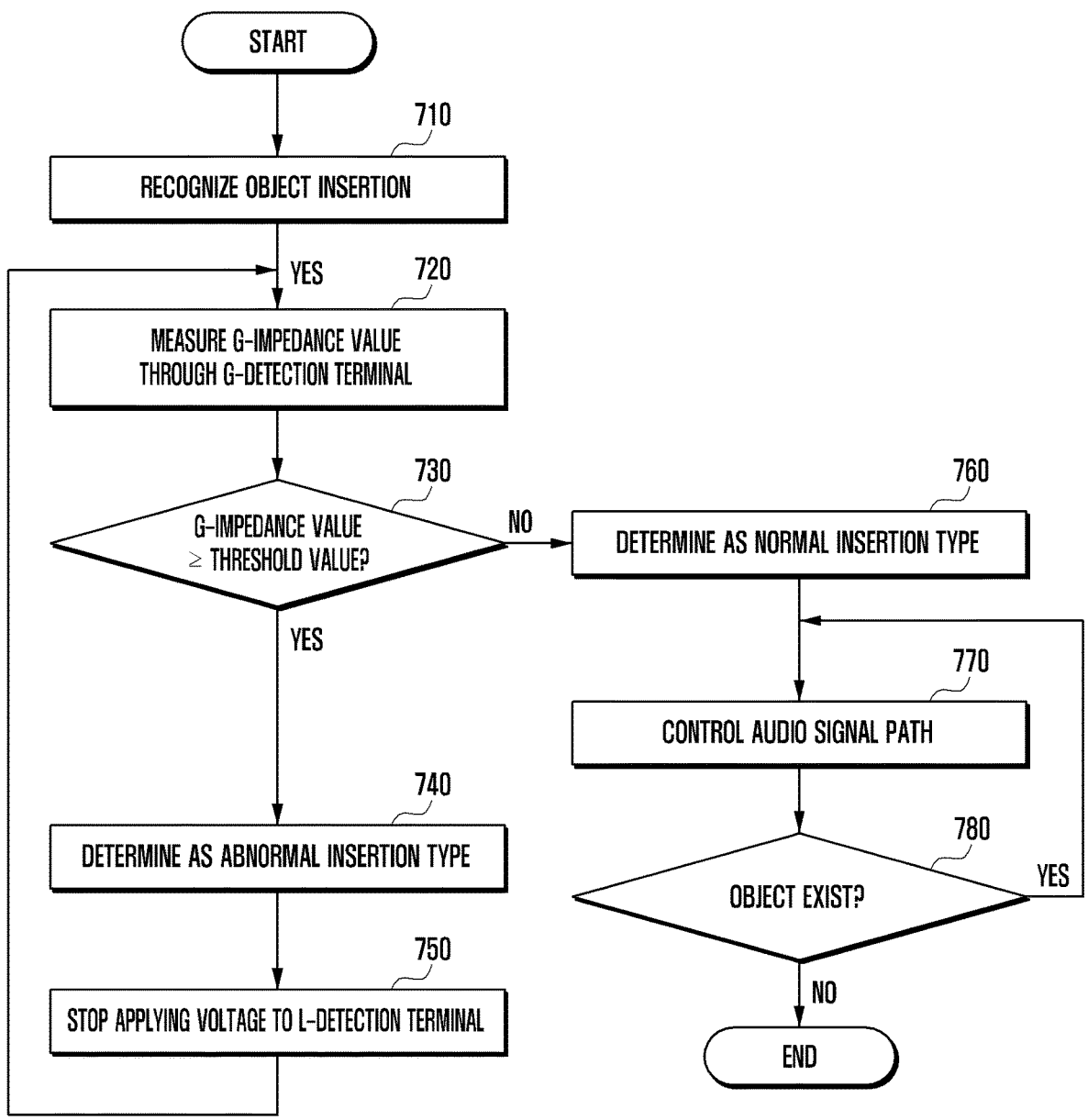
FIG. 7 is a flowchart illustrating an example method for preventing and/or reducing audio jack corrosion of an electronic device according to various embodiments.

FIG. 7 is a flowchart illustrating an example method for preventing and/or reducing audio jack corrosion of an electronic device according to various embodiments.

Referring to FIG. 7, at operation 710, a processor (e.g., the processor 120 in FIG. 1) of the electronic device (e.g., the electronic device 101 in FIG. 1, the electronic device 300 in FIG. 3, the electronic device 500 in FIG. 5, or the electronic device 600 in FIG. 6) may recognize an insertion of an object into an audio jack (e.g., the audio jack 401 in FIG. 4, the audio jack 501 in FIG. 5, or the audio jack 601 in FIG. 6). For example, based on an L-impedance value measured from an L-detection terminal (e.g., the L-detection terminal 430 in FIG. 4, the L-detection terminal 530 in FIG. 5, or the L-detection terminal 630 in FIG. 6) of the audio jack, the processor may determine whether an object is inserted. For example, when the L-impedance value is changed, the processor may determine that an object is inserted. When an object insertion is recognized, the processor may perform operation 720.

At operation 720, the processor may measure a G-impedance value through a G-detection terminal (e.g., the G-detection terminal 440 in FIG. 4, the G-detection terminal 540 in FIG. 5, or the G-detection terminal 640 in FIG. 6) of the audio jack. For example, the processor may apply a predetermined voltage (or current) to the G-detection terminal and thereby measure the G-impedance value.

At operation 730, the processor may compare the measured G-impedance value with a threshold value. For example, this threshold value may be set experimentally based on a value measured when moisture exists in the audio jack, and a value measured when a jack plug is inserted into the audio jack.

When the measured G-impedance value is smaller than the threshold value ("No" in operation 730), the processor may determine at operation 760 that an object insertion type is a normal insertion type. That is, the processor may recognize that a jack plug of an audio device has been inserted into the audio jack.

At operation 770, the processor may control an audio signal path to direct toward the audio jack, upon recognition that the audio device is connected to the electronic device. For example, the processor may control the audio signal path to be suitable for an audio jack output mode.

At operation 780, the processor may determine whether an object exists in the audio jack. When the object still exists ("Yes" in operation 770), the processor may maintain the operation 770. When the object does not exist anymore ("No" in operation 770), the processor may terminate a process. For example, because the inserted object has been determined as a normal insertion type, the processor may determine the existence of the object, based on a change amount of the L-impedance value measured from the L-detection terminal.

When the measured G-impedance value is equal to or greater than the threshold value ("Yes" in operation 730), the processor may determine at operation 740 that an object insertion type is an abnormal insertion type. In other words, the processor may recognize that moisture has been introduced as an object into the audio jack. In this case, the processor may control the audio signal path to be suitable for a speaker mode.

At operation 750, the processor may stop applying a voltage to the L-detection terminal. For example, the processor may cut off the supply of power to a detection circuit connected to the L-detection terminal in one embodiment, or turn off a switch to cut off a voltage applying path to the L-detection terminal in another embodiment. Both are, however, examples only and are not to be construed as a limitation. Because no voltage is applied to the L-detection terminal, the processor does not measure the L-impedance value caused by the object. In addition, even if moisture exists at the L terminal and the L-detection terminal, it is possible to prevent and/or reduce corrosion in the audio jack.

After the operation 750, the processor may return to the operation 720 and measure again the G-impedance value through the G-detection terminal to determine whether moisture still exists. The moisture introduced into the audio jack will be evaporated when a certain time elapses, so that the operation 720 may be needed.

Thereafter, although not shown, when the measured G-impedance value is changed to be smaller than the predetermined threshold value after stopping applying a voltage to the L-detection terminal, the processor may resume applying the voltage to the L-detection terminal.

Figure 8:
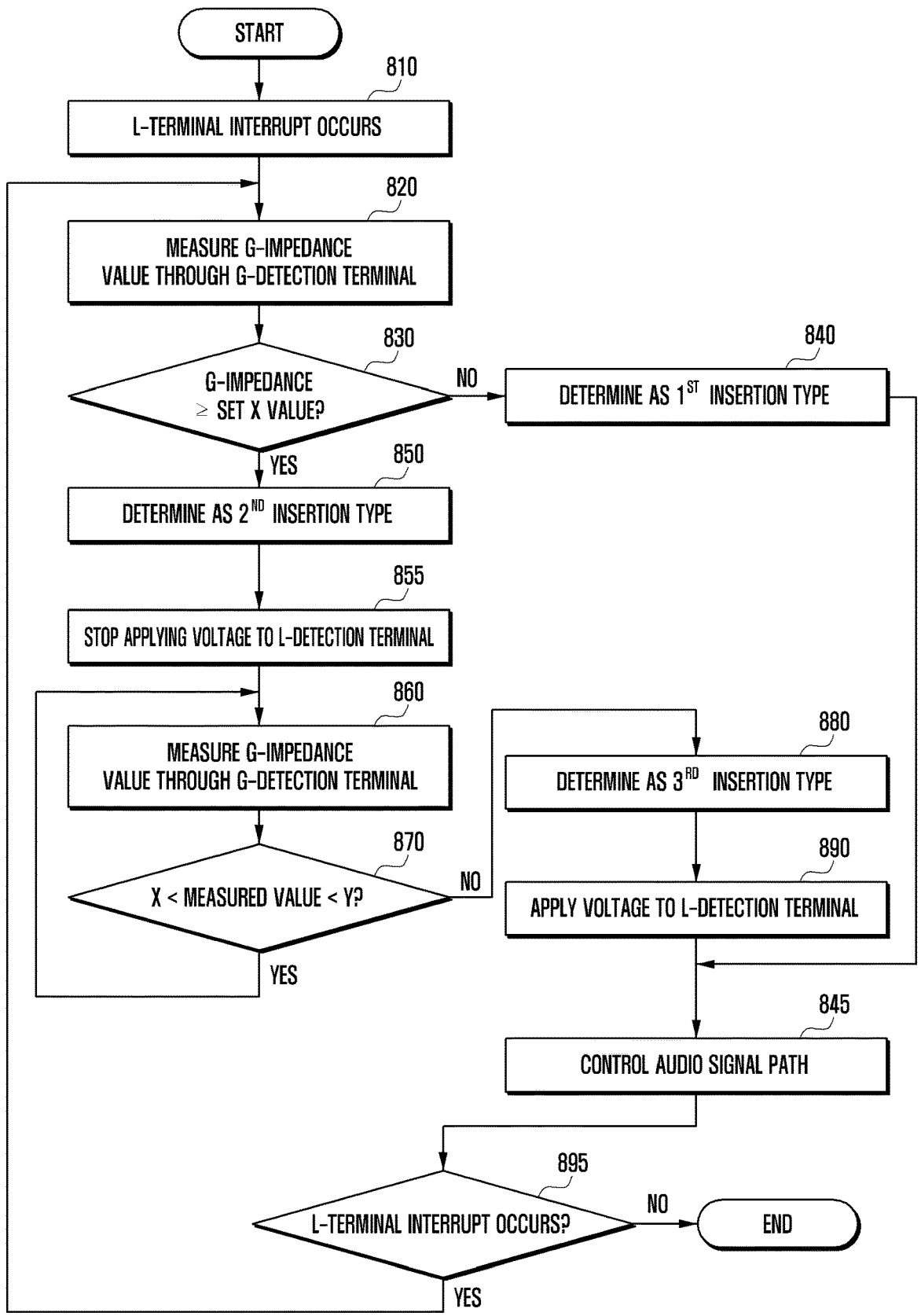
FIG. 8 is a flowchart illustrating an example method for preventing and/or reducing audio jack corrosion of an electronic device according to various embodiments.

FIG. 8 is a flowchart illustrating an example method for preventing audio jack corrosion of an electronic device according to various embodiments.

Referring to FIG. 8, at operation 810, a processor (e.g., the processor 120 in FIG. 1) of the electronic device (e.g., the electronic device 101 in FIG. 1, the electronic device 300 in FIG. 3, the electronic device 500 in FIG. 5, or the electronic device 600 in FIG. 6) may recognize an occurrence of an L-terminal interrupt from an L-detection terminal (e.g., the L-detection terminal 430 in FIG. 4, the L-detection terminal 530 in FIG. 5, or the L-detection terminal 630 in FIG. 6) of an audio jack (e.g., the audio jack 401 in FIG. 4, the audio jack 501 in FIG. 5, or the audio jack 601 in FIG. 6). For example, when an L-impedance value measured from the L-detection terminal is changed, the L-terminal interrupt may occur. The processor may recognize that an object has been inserted in the audio jack.

At operation 820, the processor may measure a G-impedance value through a G-detection terminal (e.g., the G-detection terminal 440 in FIG. 4, the G-detection terminal 540 in FIG. 5, or the G-detection terminal 640 in FIG. 6) of the audio jack. For example, the processor may apply a predetermined voltage (or current) to the G-detection terminal and thereby measure the G impedance value.

At operation 830, the processor may compare the measured G-impedance value with a set X value (or a first threshold value). In one example, the X value may be set experimentally based on a value measured when moisture exists in the audio jack, and a value measured when a jack plug is inserted into the audio jack.

When the measured G-impedance value is smaller than the X value ("No" in operation 830), the processor may determine at operation 840 that an object insertion type is a first insertion type, and recognize that a jack plug of an audio device has been inserted into the audio jack. At operation 845, the processor may control an audio signal path to be suitable for an audio jack output mode, upon recognition that the audio device is connected to the electronic device. At operation 895, the processor may determine whether the L-terminal interrupt occurs. When the L-terminal interrupt occurs ("Yes" in operation 895), the processor may return to the operation 820 to measure the G-impedance value. When the L-terminal interrupt does not occur ("No" in operation 895), the processor may terminate the process.

When the measured G-impedance value is equal to or greater than the X value ("Yes" in operation 830), the processor may determine at operation 850 that an object insertion type is a second insertion type, and recognize, for example, that an abnormal substance such as moisture has been introduced as an object into the audio jack. In this case, the processor may control the audio signal path to be suitable for a speaker mode.

In addition, at operation 855, the processor may stop applying a voltage to the L-detection terminal. For example, the processor may cut off the supply of power to a detection circuit connected to the L-detection terminal in an example embodiment, or turn off a switch to cut off a voltage applying path to the L-detection terminal in another embodiment. Both are, however, examples only and are not to be construed as a limitation. At this operation, because no voltage is applied to the L-detection terminal, the occurrence of the L-terminal interrupt is disabled at the L-detection terminal.

At operation 860, the processor may measure again the G-impedance value through the G-detection terminal to determine whether moisture still exists. The moisture introduced into the audio jack will be evaporated when a certain time elapses, so that the processor may measure the G-impedance value through the G-detection terminal periodically or repeatedly at predetermined time intervals.

At operation 870, the processor may further compare the measured G-impedance value with a set Y value (or a second threshold value). In other words, the processor may determine whether the measured G-impedance value, previously determined to be equal to or greater than the X value, is smaller than the Y value. In an example, the Y value may be set experimentally based on a value measured when a jack plug is inserted with moisture, and a value measured when a jack plug is inserted without moisture. When the measured G-impedance value is smaller than the Y value, the processor may return to the operation 860 and measure again the G-impedance value.

When the measured G-impedance value is equal to or greater than the Y value ("No" in operation 870), the processor may determine at operation 880 that an object insertion type is a third insertion type, and recognize, for example, that both moisture and the jack plug have been inserted together into the audio jack.

In case of the third insertion type, the audio jack should operate normally. Thus, at operation 890, the processor may resume applying the voltage to the L-detection terminal. At operation 845, the processor may control an audio signal path to be suitable for an audio jack output mode, upon recognition that the audio device is connected to the electronic device.

At operation 895, the processor may determine whether the L-terminal interrupt occurs. When the L-terminal interrupt occurs, the processor may return to the operation 820 to measure the G-impedance value. When the L-terminal interrupt does not occur, the processor may control the audio signal path to be suitable for a speaker mode, upon recognition that an object has been removed from the audio jack, and then terminate a process.

Figure 9:
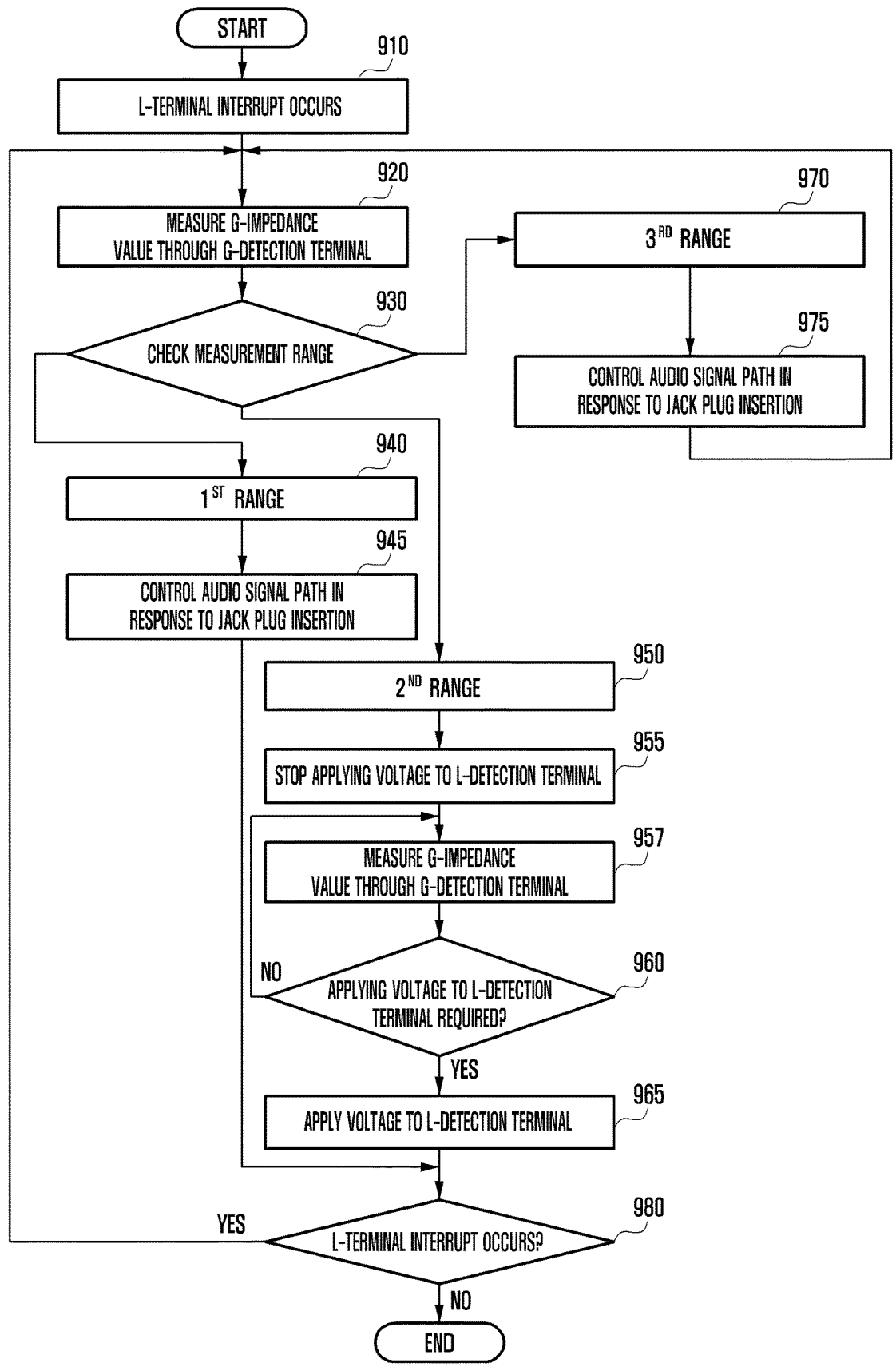
FIG. 9 is a flowchart illustrating an example method for preventing and/or reducing audio jack corrosion of an electronic device according to various embodiments.

FIG. 9 is a flowchart illustrating an example method for preventing and/or reducing audio jack corrosion of an electronic device according to various embodiments.

Referring to FIG. 9, at operation 910, a processor (e.g., the processor 120 in FIG. 1) of the electronic device (e.g., the electronic device 101 in FIG. 1, the electronic device 300 in FIG. 3, the electronic device 500 in FIG. 5, or the electronic device 600 in FIG. 6) may recognize an occurrence of an L-terminal interrupt from an L-detection terminal (e.g., the L-detection terminal 430 in FIG. 4, the L-detection terminal 530 in FIG. 5, or the L-detection terminal 630 in FIG. 6) of an audio jack (e.g., the audio jack 401 in FIG. 4, the audio jack 501 in FIG. 5, or the audio jack 601 in FIG. 6). For example, when an L-impedance value measured from the L-detection terminal is changed, the L-terminal interrupt may occur. Then, the processor may recognize that an object has been inserted in the audio jack.

At operation 920, the processor may measure a G-impedance value through a G-detection terminal (e.g., the G-detection terminal 440 in FIG. 4, the G-detection terminal 540 in FIG. 5, or the G-detection terminal 640 in FIG. 6) of the audio jack. For example, the processor may apply a predetermined voltage (or current) to the G-detection terminal and thereby measure the G impedance value.

At operation 930, the processor may check a measurement range of the measured G-impedance value. According to an embodiment, the processor may distinguish some measurement ranges for determining audio jack insertion types, based on a G-impedance value measured in a condition where no moisture exists in the audio jack, a G-impedance value measured in a condition where the jack plug is inserted into the audio jack, a G-impedance value measured in a condition where moisture exists in the audio jack, and a G-impedance value measured in a condition where moisture exists in the audio jack and also the jack plug is inserted into the audio jack. For example, a first range may be defined as satisfying a condition where the jack plug is inserted, a second range may be defined as satisfying a condition where moisture exists in the audio jack, and a third range may be defined as satisfying a condition where both moisture and the jack plug exist together in the audio jack. These ranges are, however, exemplary only and not to be construed as a limitation. Other various ranges may be alternatively defined according to various conditions.

When the measurement range of the measured G-impedance value is identified as the first range at operation 940, the processor may control an audio signal path to be suitable for an audio jack output mode at operation 945 in response to an insertion of the jack plug.

When the measurement range of the measured G-impedance value is identified as the second range at operation 950, the processor may recognize that moisture exists in the audio jack. At operation 955, the processor may stop applying a voltage to the L-detection terminal. For example, the processor may cut off the supply of power to a detection circuit connected to the L-detection terminal in one embodiment, or turn off a switch to cut off a voltage applying path to the L-detection terminal in another embodiment. Both are, however, exemplar only and not to be construed as a limitation.

At operation 957, the processor may measure again the G-impedance value through the G-detection terminal to determine whether moisture still exists. The moisture introduced into the audio jack will be evaporated when a certain time elapses, so that the processor may measure the G-impedance value through the G-detection terminal periodically or repeatedly at predetermined time intervals.

At operation 960, the processor may check again the measurement range of the measured G-impedance value and thereby determine whether applying a voltage to the L-detection terminal is required. For example, when the measurement range indicates that there is no moisture, the processor may determine that applying a voltage to the L-detection terminal is required. On the other hand, when the measurement range does not indicate applying a voltage, the processor may return to the operation 957 to measure again the G-impedance value.

When the measurement range of the measured G-impedance value is identified as the third range at operation 970, the processor may recognize that both moisture and the jack plug exist together in the audio jack. Therefore, at operation 975, the processor may control an audio signal path to be suitable for an audio jack output mode, upon recognition that the audio device is connected to the electronic device. Thereafter, the processor may return to the operation 920 because moisture still exists in the audio jack.

According to various embodiments, a method for preventing and/or reducing audio jack corrosion in an electronic device (e.g., the electronic device 101 in FIG. 1, the electronic device 300 in FIG. 3, the electronic device 500 in FIG. 5, or the electronic device 600 in FIG. 6) may include detecting an occurrence of an insertion interrupt of an object through a first detection terminal among a plurality of terminals included in an audio jack (e.g., the audio jack 401 in FIG. 4, the audio jack 501 in FIG. 5, or the audio jack 601 in FIG. 6); measuring an impedance value through a second detection terminal among the plurality of terminals in response to the insertion interrupt; determining whether the object is a jack plug, based on the measured impedance value; and stopping applying a voltage to the first detection terminal based on the object being determined to be an abnormal substance other than the jack plug.

In an example embodiment, the plurality of terminals may include a left (L) terminal (e.g., the L terminal 411 in FIG. 4, the L terminal 511 in FIG. 5, or the L terminal 611 in FIG. 6), a right (R) terminal (e.g., the R terminal 412 in FIG. 4, the R terminal 512 in FIG. 5, or the R terminal 612 in FIG. 6), a ground (G) terminal (e.g., the G terminal 413 in FIG. 4, the G terminal 513 in FIG. 5, or the G terminal 613 in FIG. 6), a microphone (M) terminal (e.g., the M terminal 414 in FIG. 4, the M terminal 514 in FIG. 5, or the M terminal 614 in FIG. 6), an L-detection terminal (e.g., the L-detection terminal 430 in FIG. 4, the L-detection terminal 530 in FIG. 5, or the L-detection terminal 630 in FIG. 6), and a G-detection terminal (e.g., the G-detection terminal 440 in FIG. 4, the G-detection terminal 540 in FIG. 5, or the G-detection terminal 640 in FIG. 6). In addition, the first detection terminal may be the L-detection terminal, and the second detection terminal may be the G-detection terminal.

In an example embodiment, the determining may include determining the object to be the jack plug for transmitting and receiving an audio signal when the measured impedance value is smaller than a first threshold value, and determining the object to be an abnormal substance other than the jack plug when the measured impedance value is equal to or greater than the first threshold value.

In an example embodiment, based on applying the voltage to the first detection terminal being stopped, an audio signal output mode may be not switched to an earphone output mode.

In an example embodiment, after applying the voltage to the first detection terminal is stopped, the method may further include periodically checking a change in the impedance value measured through the second detection terminal at a predetermined time interval.

In an example embodiment, after applying the voltage to the first detection terminal is stopped, the method may further include periodically checking a change in the impedance value measured through the second detection terminal at a predetermined time interval based on the impedance value measured through the second detection terminal being changed to be equal to or greater than the first threshold value and be smaller than a second threshold value; and resuming applying the voltage to the first detection terminal based on the impedance value measured through the second detection terminal being changed to be equal to or greater than the second threshold value after applying the voltage to the first detection terminal is stopped.

In an example embodiment, based on the object being determined to be the jack plug, an audio mode of the electronic device may be switched to an audio jack output mode, and based on the object being determined to be the abnormal substance, the audio mode of the electronic device may be switched to a speaker mode.

In an example embodiment, applying the voltage to the first detection terminal may be stopped by cutting off a power supply to a detection circuit connected to the first detection terminal or by turning off a control switch connected to the first detection terminal.

Figure 10:
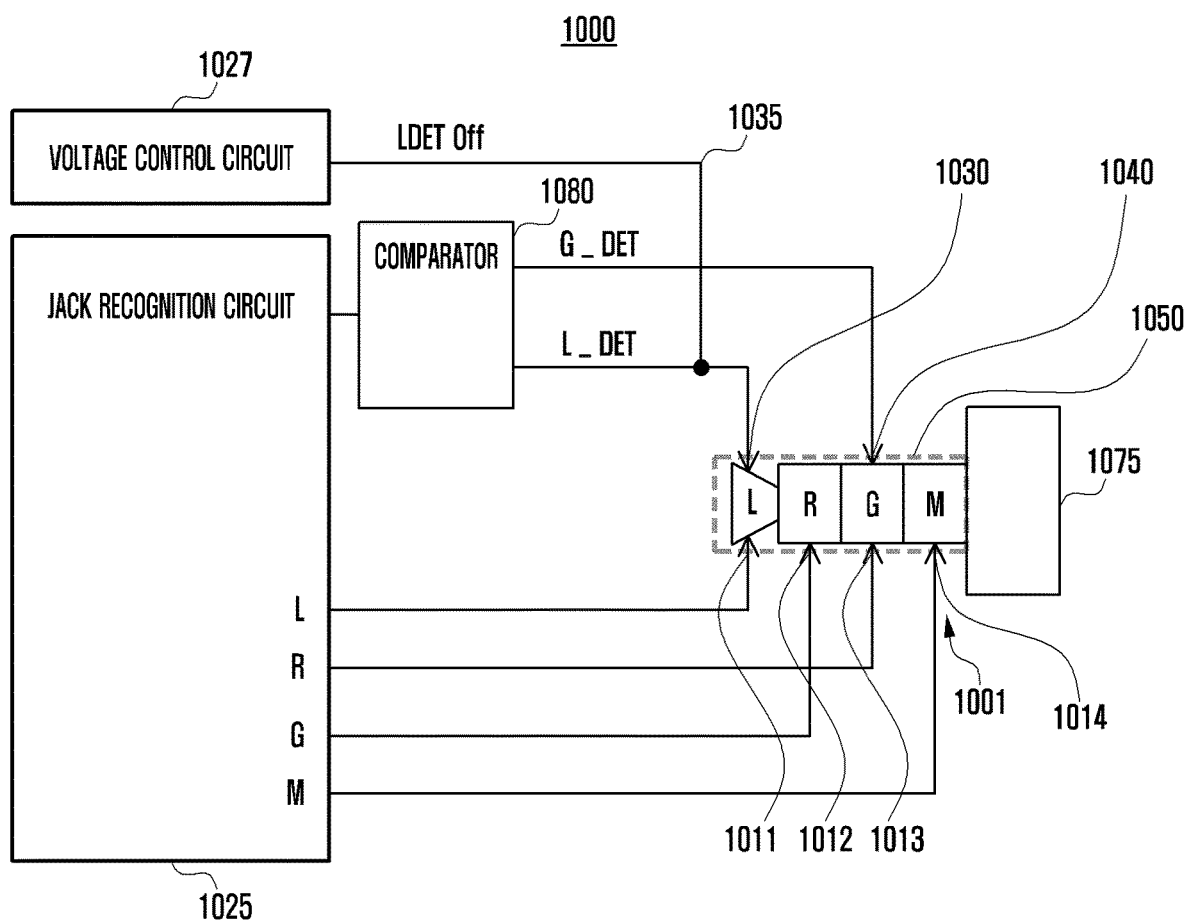
FIG. 10 is a schematic diagram illustrating an example electronic device including an audio jack according to an embodiment.

FIG. 10 is a schematic diagram illustrating an example electronic device including an audio jack according to an embodiment.

Referring to FIG. 10, the audio jack (e.g., the audio jack 401 in FIG. 4) of the electronic device (e.g., the electronic device 101 in FIG. 1, the electronic device 300 in FIG. 3) may be electrically connected to a jack recognition circuit 1025 and a voltage control circuit 1027.

The audio jack 1001 may include an insertion passage 1050 into or from which a jack plug 1075 is inserted or removed through a connector hole (e.g., the second connector hole 309 in FIG. 3). The audio jack may include an L terminal 1011, an R terminal 1012, a G terminal 1013, an M terminal 1014, an L-detection terminal 1030, and a G-detection terminal 1040.

The L terminal 1011, the R terminal 1012, the G terminal 1013, and the M terminal 1014 may be connected to the jack recognition circuit 1025, and the L-detection terminal 1030 and the G-detection terminal 1040 may be connected to a comparator 1080. The comparator 1080 may be electrically connected to the jack recognition circuit 1025. The comparator 1080 may detect an object insertion and identify an object type, based on an L-impedance value measured from the L-detection terminal 1030 and a G-impedance value measured from the G-detection terminal 1040. Then, the comparator 1080 may transmit such information to the jack recognition circuit 1025.

The comparator 1080 may detect a change in the L-impedance value measured from the L-detection terminal 1030 and deliver the change information of the L-impedance value to the jack recognition circuit 1025. The comparator 1080 may detect a change in the G-impedance value measured from the G-detection terminal 1040 and may deliver the change information of the G-impedance value to the jack recognition circuit 1025. The operation of the jack recognition circuit 1025 is the same as that of the jack recognition circuit 525 shown in FIG. 5, so that detailed description thereof will not be repeated here.

As described above, the electronic device having the audio jack can prevent and/or reduce corrosion of the audio jack terminals by stopping applying the voltage to at least one of the audio jack terminals when moisture remains in the audio jack. In addition, by preventing and/or reducing the corrosion of the audio jack, the electronic device can prevent and/or reduce the normally inserted jack plug from being unrecognized or misrecognized due to the corrosion of the audio jack. This can improve the audio jack recognition performance.

As used herein, the term "module" may include a unit implemented in hardware, software, firmware, or any combinations thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the scope of the subject matter as defined, for example, by the appended claims.

What is claimed is:

1. An electronic device comprising:
an audio jack including a plurality of terminals including a first detection terminal and a second detection terminal;
at least one processor functionally connected to the audio jack; and
a memory,
wherein the memory stores instructions that, when executed by the at least one processor, control the electronic device to:
detect an occurrence of an insertion interrupt of an object in the audio jack through the first detection terminal,
determine whether the object is a jack plug based on an impedance value measured through the second detection terminal, and
stop applying a voltage to the first detection terminal based on the object being determined to not be the jack plug,
wherein the plurality of terminals include a left (L) terminal, a right (R) terminal, a ground (G) terminal, a microphone (M) terminal, an L-detection terminal, and a G-detection terminal, and the first detection terminal is the L-detection terminal, and the second detection terminal is the G-detection terminal.

2. The electronic device of claim 1, wherein the electronic device is further controlled to, based on detecting the occurrence of the insertion interrupt of the object in the audio jack, measure an impedance value through the second detection terminal.

3. The electronic device of claim 1, wherein the instructions, when executed by the at least one processor, further control the electronic device to:
determine the object to be the jack plug based on the impedance value measured through the second detection terminal being smaller than a first threshold value, and
determine the object to be an abnormal substance other than the jack plug based on the impedance value measured through the second detection terminal being equal to or greater than the first threshold value.

4. The electronic device of claim 3, wherein the instructions, when executed by the at least one processor, further control the electronic device to:
periodically check a change in the impedance value measured through the second detection terminal at a predetermined time interval after applying the voltage to the first detection terminal is stopped.

5. The electronic device of claim 3, wherein the instructions, when executed by the at least one processor, further control the electronic device to:
resume applying the voltage to the first detection terminal based on the impedance value measured through the second detection terminal being changed to be smaller than the first threshold value after applying the voltage to the first detection terminal is stopped.

6. The electronic device of claim 3, wherein the instructions, when executed by the at least one processor, further control the electronic device to:
periodically check a change in the impedance value measured through the second detection terminal at a predetermined time interval based on the impedance value measured through the second detection terminal being changed to be equal to or greater than the first threshold value and to be smaller than a second threshold value after applying the voltage to the first detection terminal is stopped, and
resume applying the voltage to the first detection terminal based on the impedance value measured through the second detection terminal being changed to be equal to or greater than the second threshold value after applying the voltage to the first detection terminal is stopped.

7. The electronic device of claim 1, wherein the instructions, when executed by the at least one processor, further control the electronic device to:
switch an audio mode of the electronic device to an audio jack output mode based on the object being determined to be the jack plug, and
switch the audio mode of the electronic device to a speaker mode based on the object being determined to be an abnormal substance.

8. The electronic device of claim 7, wherein the audio jack output mode is a mode in which an audio signal path is directed toward the plurality of terminals of the audio jack.

9. The electronic device of claim 1, wherein the instructions, when executed by the at least one processor, further control the electronic device to:
identify a range of the impedance value measured through the second detection terminal,
based on the identified range being a first measurement range, direct an audio signal path toward the plurality of terminals of the audio jack upon recognition that the jack plug exists in the audio jack,
based on the identified range being a second measurement range, stop applying a voltage to the first detection terminal upon recognition that an abnormal substance exists in the audio jack, and periodically check the range of the impedance value measured through the second detection terminal, and
based on the identified range being a third measurement range, direct the audio signal path toward the plurality of terminals of the audio jack, upon recognition that both the jack plug and the abnormal substance exist together in the audio jack.

10. The electronic device of claim 1, further comprising:
a voltage control circuit electrically connected to the first detection terminal; and
a jack recognition circuit electrically connected to the first and second detection terminals,
wherein the instructions, when executed by the at least one processor, further control the electronic device to:
detect an occurrence of an insertion interrupt in the jack recognition circuit,
based on the object being determined to be an abnormal substance, provide the voltage control circuit with information indicating that the object is the abnormal substance other than the jack plug, and
control the voltage control circuit to stop applying the voltage to the first detection terminal.

11. The electronic device of claim 1, further comprising:
a control switch electrically connected to the processor and the first detection terminal,
wherein the instructions, when executed by the at least one processor, further control the electronic device to turn on or off the control switch to apply or stop applying the voltage to the first detection terminal.

12. A method for preventing and/or reducing audio jack corrosion in an electronic device, the method comprising:
detecting an occurrence of an insertion interrupt of an object through a first detection terminal among a plurality of terminals included in an audio jack;
measuring an impedance value through a second detection terminal among the plurality of terminals in response to detecting the insertion interrupt;

determining whether the object is a jack plug, based on the measured impedance value through the second detection terminal; and stopping applying a voltage to the first detection terminal when the object is determined not to be the jack plug, wherein the plurality of terminals include a left (L) terminal, a right (R) terminal, a ground (G) terminal, a microphone (M) terminal, an L-detection terminal, and a G-detection terminal, and wherein the first detection terminal is the L-detection terminal, and the second detection terminal is the G-detection terminal.

13. The method of claim 12, wherein the determining includes:

determining the object to be the jack plug based on the measured impedance value being smaller than a first threshold value, and determining the object to be an abnormal substance other than the jack plug based on the measured impedance value being equal to or greater than the first threshold value.

14. The method of claim 13, wherein after applying the voltage to the first detection terminal is stopped, the method further comprises:

periodically checking a change in the impedance value measured through the second detection terminal at a predetermined time interval based on the impedance value measured through the second detection terminal being changed to be equal to or greater than the first threshold value and to be smaller than a second threshold value; and resuming applying the voltage to the first detection terminal based on the impedance value measured through the second detection terminal being changed to be equal to or greater than the second threshold value after applying the voltage to the first detection terminal is stopped.

15. The method of claim 13, wherein based on the object being determined to be the jack plug, an audio mode of the electronic device is switched to an audio jack output mode, and wherein based on the object being determined to be the abnormal substance, the audio mode of the electronic device is switched to a speaker mode.

16. The method of claim 12, wherein based on applying the voltage to the first detection terminal being stopped, an audio signal output mode is not switched to an earphone output mode.

17. The method of claim 12, wherein after applying the voltage to the first detection terminal is stopped, the method further comprises:

periodically checking a change in the impedance value measured through the second detection terminal at a predetermined time interval.

18. The method of claim 12, wherein applying the voltage to the first detection terminal is stopped by cutting off a power supply to a detection circuit connected to the first detection terminal or by turning off a control switch connected to the first detection terminal.

\* \* \* \* \*